US010242298B2

(12) United States Patent
Gracia et al.

(10) Patent No.: US 10,242,298 B2
(45) Date of Patent: Mar. 26, 2019

(54) METHOD OF PRINTING AND PRINTER

(71) Applicant: HEWLETT-PACKARD DEVELOPMENT COMPANY, L.P., Houston, TX (US)

(72) Inventors: Antonio Gracia, Barcelona (ES); Joan Jorba, Sant Cugat del Valles (ES); Marina Cantero, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 4 days.

(21) Appl. No.: 15/542,813

(22) PCT Filed: Jan. 30, 2015

(86) PCT No.: PCT/EP2015/051967
§ 371 (c)(1),
(2) Date: Jul. 11, 2017

(87) PCT Pub. No.: WO2016/119891
PCT Pub. Date: Aug. 4, 2016

(65) Prior Publication Data
US 2017/0372178 A1 Dec. 28, 2017

(51) Int. Cl.
*B41J 2/13* (2006.01)
*B41J 2/21* (2006.01)
*G06K 15/10* (2006.01)

(52) U.S. Cl.
CPC .......... *G06K 15/107* (2013.01); *B41J 2/2132* (2013.01); *B41J 2/13* (2013.01)

(58) Field of Classification Search
CPC ........ B41J 2/2132; B41J 2/13; B41J 2/04526; B41J 2/04551; B41J 2/04558; B41J 2/04573; G06K 15/107
See application file for complete search history.

(56) References Cited

U.S. PATENT DOCUMENTS 6,561,609 B2  5/2003  Bauer
6,764,162 B2  7/2004  Biddle et al.
(Continued)

OTHER PUBLICATIONS

Mustafa Kamasak; "Dynamic Print Mode Control for Inkjet Printing"; Oct. 26, 2001; https://engineering.purdue.edu/~bouman/publications/pdf/nip01mustafa.pdf.

*Primary Examiner* — Thinh H Nguyen
(74) *Attorney, Agent, or Firm* — HP Inc. Patent Department

(57) ABSTRACT

A method of controlling a printer is described, for printing a pattern from a first row of fluid ejection nozzles and a second row of fluid ejection nozzles in a multi-pass printing mode. The first and second rows of fluid ejection nozzles eject fluid of a first type and fluid of a second type, respectively. The method comprises: assigning respective parts of the pattern to be printed to the first and second rows of fluid ejection nozzles; applying a first mask to the first row of said ejection nozzles and a second mask to the second row of fluid ejection nozzles for printing with selected nozzles of each of the rows of fluid ejection nozzles during each pass; wherein the first mask comprises a mesa portion and the second mask comprises a mesa portion wherein the mesa portion of the first mask includes at least a first peak and the mesa portion of the second mask includes at least a second valley, the first peak overlapping with the second valley.

18 Claims, 4 Drawing Sheets

(56) References Cited

U.S. PATENT DOCUMENTS

| | | |
|---|---|---|
| 7,472,983 B2 | 1/2009 | Fellingham et al. |
| 8,272,710 B2 | 9/2012 | Spaulding et al. |
| 2010/0110131 A1* | 5/2010 | Nashimoto ............ B41J 2/2132 347/12 |
| 2014/0210888 A1 | 7/2014 | Muller et al. |

* cited by examiner

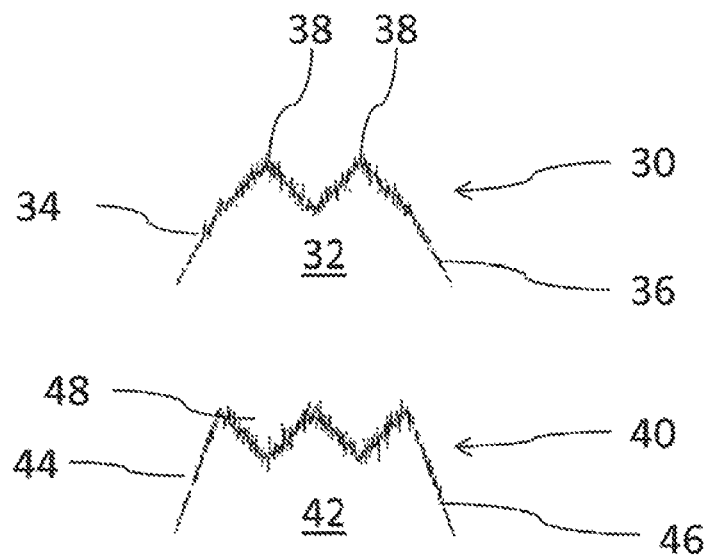
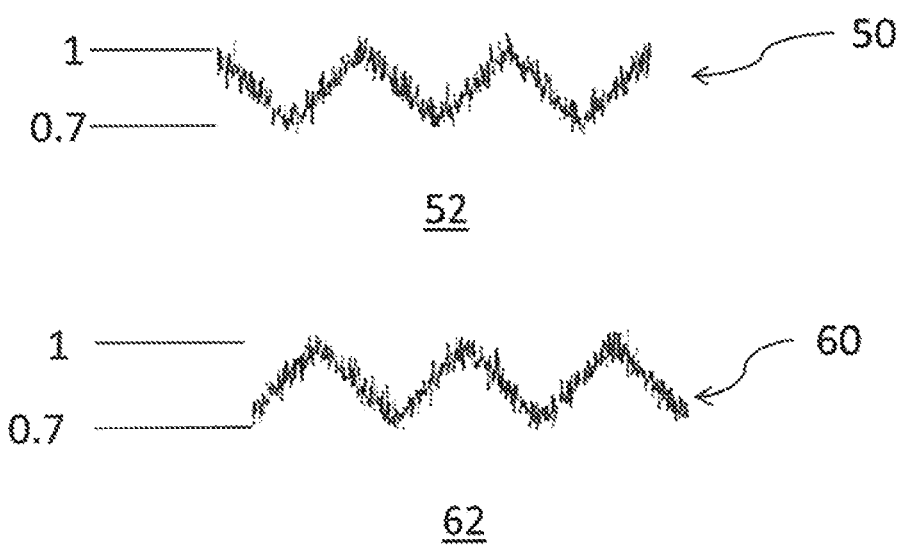
Fig. 4
Fig. 5

METHOD OF PRINTING AND PRINTER

BACKGROUND

A color printer may include a number of print heads. A print head may, for example, contain dies, wherein each die may be associated with the same or different colors. A die may provide lines or rows of fluid ejection nozzles, also referred to as nozzle trenches. When printing with a number of print heads, using a multi-pass printing mode, masks may be applied to the nozzles to selectively deposit droplets of printing fluid on a print medium, pass by pass, to control the printing process. Print masks may help to prevent or reduce visible artifacts, such as image banding.

SHORT DESCRIPTION OF DRAWINGS

Examples of this disclosure now are described with reference to the drawings, wherein.

Figure 3:
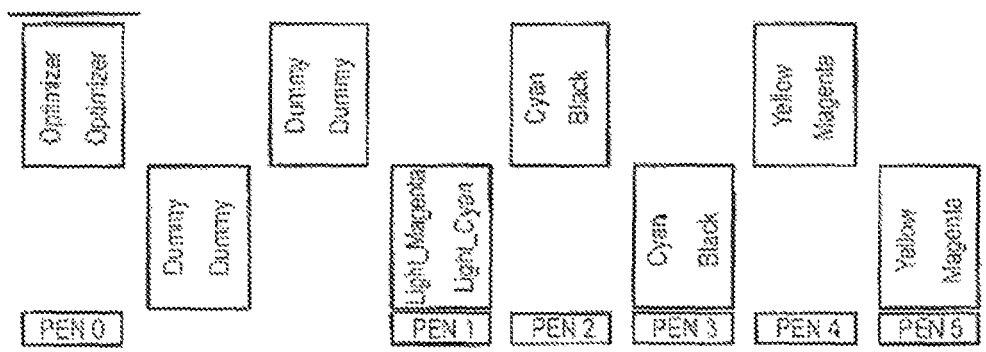
FIG. 3 shows a schematic representation of a print head arrangement in a printer according to one example.
Figure 6:
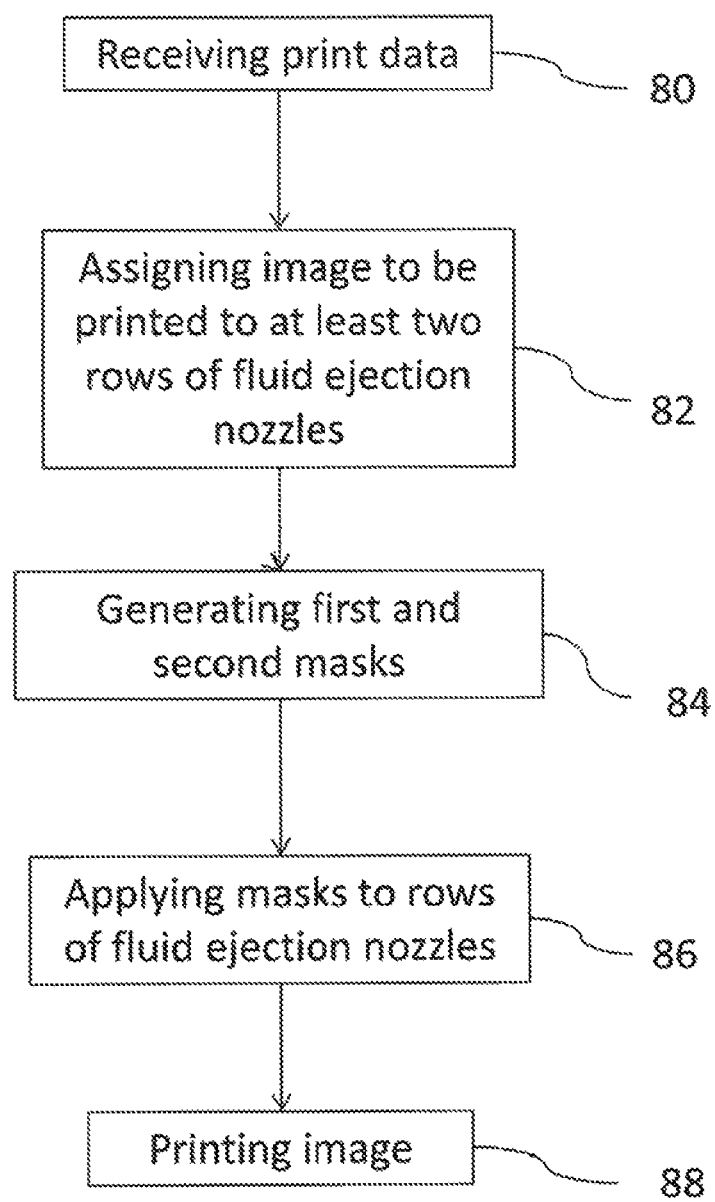

FIG. 4 schematically shows a masking scheme for one of the print heads of FIG. 3 for illustrating a method according to one example;

FIG. 5 schematically shows another masking scheme for one of the print beads of FIG. 3 for illustrating a method according to one example;

FIG. 6 shows a flow diagram of a method according to one example.

DESCRIPTION OF EXAMPLES

While, in the present application, a number of examples are described for illustration, this disclosure is not limited to these specific examples described and can be applied to similar devices, systems, methods and processes. The examples provided herein may relate to a large format printer or a desktop printer, such as an inkjet printer having a number of print heads for dispensing printing fluid. The print heads may be provided on a carriage for scanning over a print medium or may be provided in form of a page-wide printing array. In some examples, each print head contains dies wherein each die is provided for the same or different colors. For example, one print bead may comprise one die, the die having two nozzle trenches which provide two rows of fluid ejection nozzles. While the present disclosure will make reference to print heads operating with two trenches of nozzles, this disclosure is also applicable to printers having print heads operating with more than two nozzle trenches or having a number of print heads with only one nozzle trench each.

Figure 1:
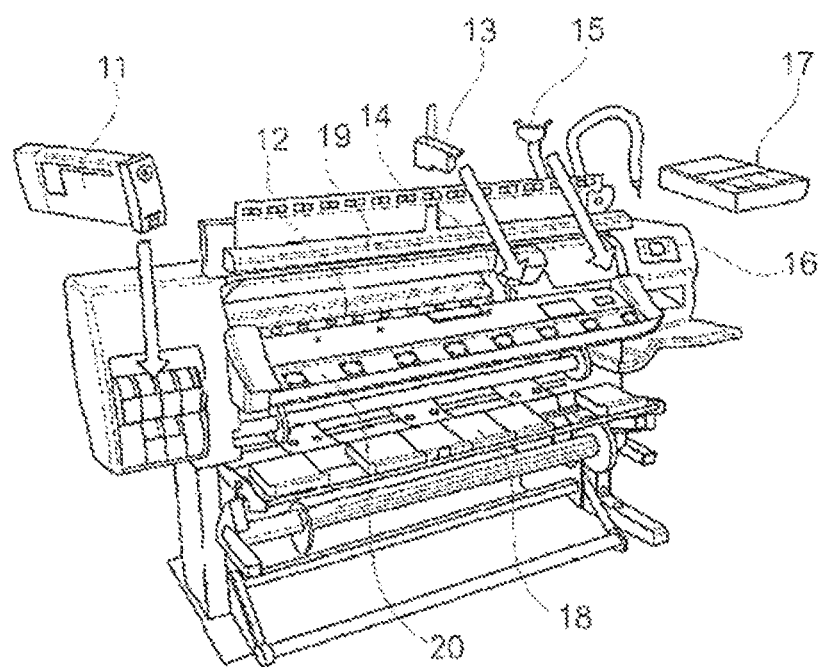
FIG. 1 shows a representation of a printer according to one example.

FIG. 1 generally shows in outline of a printer according one example. In this example the printer is a large format printer, but in other examples may be another type of printer. In this example, the printer comprises a number of ink cartridges 11, a printer platen 12, a number of print heads 13, a print head carriage 14, and ink funnel and ink tube assembly 15, a front panel 16, a print head cleaning cartridge 17, a loading table 18, a drying module 19, and a caring module 20. The printer may, in some examples, comprise further components, such as a supporting structure, a print medium feed mechanism, motors, sensors, etc. The ink cartridges 11 may be housed in a cartridge station. A printer controller is provided behind the front panel 16 for controlling operations of the printer. The print head carriage 14 may carry a number of print cartridges 13. One example of an arrangement of a number of print cartridges is illustrated in FIG. 2.

Figure 2:
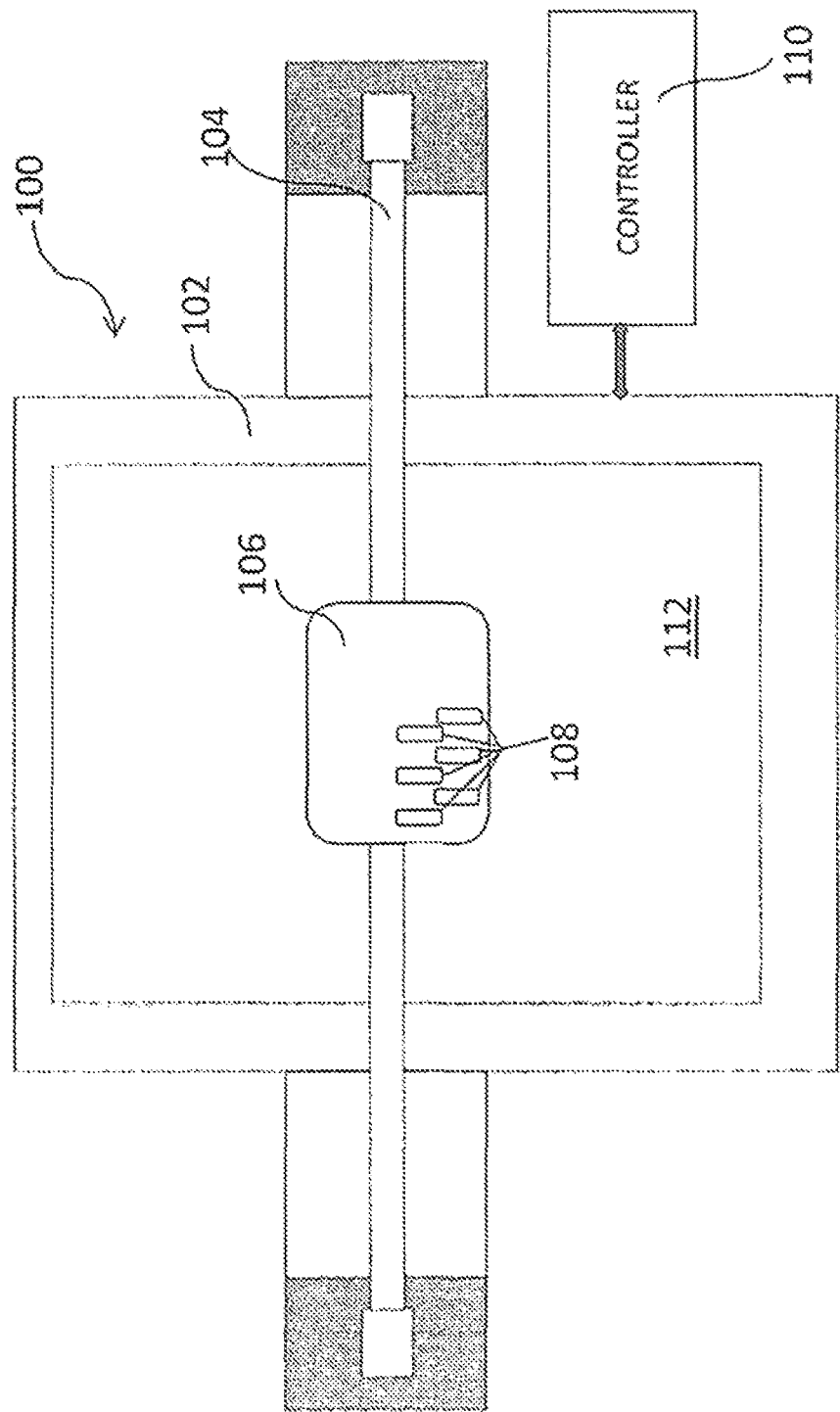
FIG. 2 shows a schematic drawing of another printer according to one example.

FIG. 2 shows a very schematic drawing of a printer, according to another example. The printer 100 comprises a frame 102, a scan axis bar 104, and a print head carriage 106. The carriage carries a number of print heads 108, each print head including rows of fluid ejection nozzles, also referred to as nozzle trenches. At least a first one of said print heads 108 ejects a first type of printing fluid, and a second one of said print heads 108 ejects a second type of printing fluid. The print heads 108 may, for example, eject different color inks, e.g. latex ink, and in some examples may eject an optimizer fluid. The print heads 108 can be arranged such that two nozzle trenches of a print head respectively eject ink of different colors. The printer 100 further comprises a printer controller 110 including a control program to control ejection of printing fluid from the print heads 108 and apply masks to at least two nozzle trenches for printing with selected nozzles of each nozzle trench during different passes of a multi-pass print mode. The control program may be resident partly or completely within the printer controller and it also may be provided by or internet with an external control device. FIG. 2 further schematically shows a print medium 112 below the carriage 106.

The print cartridge configuration shown in FIG. 3 is an example which could be used in a print head carriage providing eight cartridge slots. Just as a matter of example, five of the cartridge slots may be fitted with color ink cartridges, such as PEN0 to PEN5. Two slots may be provided with dummy cartridges or be left empty. And one slot may be provided with an optimizer fluid cartridge, such as PEN0. In the example shown in FIG. 3, each cartridge exhibits two rows of nozzle trenches wherein PEN0 is used for an optimizer fluid, with both nozzle trenches ejecting the same type of fluid. Other cartridges, PEN2 to PEN5 in this example, each provide two different color inks from the respective two trenches of nozzles. In this example, colors CMYK (cyan, magenta, yellow, black) are dispensed from two staggered nozzle trenches each, and an additional cartridge PEN1 is provided for dispensing lighter colors. An optimizer fluid may be provided as a fixer fluid or a binding fluid, for example, which is used in combination with certain inks, such as latex ink, to improve adherence of the ink to a print medium and avoid coalescence. An optimizer fluid more generally may be provided to improve image quality.

In a multi-pass printing mode, a print medium is advanced below the print heads by an increment, less than the width of the nozzles trenches for each printing pass. Accordingly, successive passes or "swaths" of the print head overlap to reduce one-dimensional periodic artifacts referred to in "banding". During these multiple passes "print masks" are applied to the print head which means printing subsets of the image pixels in multiple partially overlapping passes of the print head relative to the print medium.

Inkjet printers can be to print in a bidirectional printing mode, i.e. to deposit ink on the print medium while the print head moves both in rightward and leftward directions. When printing in a bidirectional multi-pass printing mode, banding artifacts can, for example, be caused by differences in the order of ink laydown and the timing between ink laydown on different passes. While different attributes of the printer change depending on the printing direction, having regard to optical density and color differences, a printing result may be different depending on the order of depositing drops on top of each other. For example, the print result when depositing one drop of magenta (M) ink on top of a cyan (C) drop of ink will be different when compared to depositing one drop of cyan (C) ink on top of one drop of magenta (M) ink, to just give one example. These and other differences may cause systematic variations in the optical density and color hue due to interaction between the inks of different colors and between the ink and the print medium.

There are different approaches for dealing with banding effects, such as applying masks to the nozzle trenches, interleaving, changing the order of ink deposition, weaving, pass programming selection, etc. In a multi-pass print mode, a mask is applied to the print heads during each pass so that a section, or band of an image is composed by a number of pixels printed during the number of passes. In a four-pass print mode, for example, the print medium is advanced by one fourth of a swath height after each pass and the print heads are masked to print part of the image during each pass. Ramped masks can be used, including an up-ramp, a middle mesa portion and a down-ramp.

This shall be illustrated with reference to one example: In a four-pass print mode, using ramped masks, instead of laying down a uniform amount of ink over the whole height of the swath, the quantity of ink laid down can be made to linearly increase from zero at the top of the swath to a third of the desired density at a quarter of the depth of the swath, then remain constant a third of the desired density until reaching three quarters of depth of the swath, and then linearly decrease to zero, such that the nozzle profile, or mask profile, has the shape of an isosceles trapezoid, just as one example. In this example, the print medium is advanced through the printer by a quarter of the height of the swath after each pass. In this case, when the density of four subsequent swathes is summed up, the resultant profile is a flat one having the third density. This is because the ramp up and ramp down of the two swathes sum exactly to a third of the desired density, equal to the density deposited across the center of the mask profile. Less ink hence will be deposited in the side parts of the swath to avoid boundary banding effects. Most of these masking schemes provide approaches where most of the ink is fired in only a portion of the passes and then compensated with ramps during the remaining passes. In particular, when only a low number of passes is provided, the interaction between the ink and the print medium and boundary effects due to coalescence between printed passes may have a great effect on visual banding.

In a given printed swath over the media, the zones where the ramps have been printed, will be compensated in following passes by the following mesa-portions, until constructing the entire image The above strategy does not take into account banding artifacts caused by bidirectional printing. When the same masking strategy is used for any die and any pass, banding effects are more likely to occur.

One strategy to minimize banding effects due to deviations in optical density or color differences when printing in bidirectional print modes is to use alternate voids or alternate extreme ramps at the ends of the swath for more problematic colors, such as light colors.

In an example, the present disclosure proposes a method of controlling a printer to print a pattern or image from a first row of fluid ejection nobles and a second row of fluid ejection nozzles in a multi-pass printing mode, the first and second rows of fluid ejection nozzles ejecting fluid of a first type and fluid of a second type, respectively. Respective parts of the pattern or image to be printed are assigned to the first and second rows of fluid ejection nozzles; and a first mask is applied to the first row of fluid ejection nobles and a second mask is applied to the second row of fluid ejection nobles for printing with selected nozzles of each of the rows of fluid ejection nozzles during each pass. Both the first mask and the second mask each comprises a mesa portion wherein the mesa portion of the first mask includes at least a first peak and the mesa portion of the second mask includes at least a second valley, the first peak overlapping with the second valley. The masks further can be to comprise first and second side ramp portions each, wherein the respective mesa portions of the first and second masks are flanked by the respective first and second side ramp portions. Each mask specifies a frequency at which the nozzles of the associated row of fluid ejection nozzles are fired during a pass of a multi-pass print mode. The pattern then is printed using the first and second masks applied to the first and second rows of fluid ejection nozzles.

While the masks are defined to have a mesa portion, and in some examples flanked by two ramps, the mesa (middle) portion of the mask, may not be not flat and may not provide for a fully equal usage of the nozzles in the respective portion of an associated nozzle trench. Rather, the mesa portion of the masks may define a usage frequency of the fluid ejection nozzles which is increased and decreased along the length of the middle portion of the nozzle trench, corresponding to mesa portion of the mask, because the mask has at least one peak or at least one valley in said mesa portion. The term, "mesa" is used because the "mesa portion" of the mask defines a higher average firing frequency of the nozzles as the side ramp portions and, looking at the overall structure of the mask, corresponds to the flat portion of conventional ramped masks having an up-ramp, a middle part and a down-ramp. The peaks and valleys provided in the mesa portion are formed by ramps having an amplitude smaller than the amplitude of the up- and down-ramps at the edges of the mask and do not reduce the firing frequency to zero. For example, a valley can define a reduction of the firing frequency and a peak can define an increase of the firing frequency of the nozzles in the respective section of the nozzle array, wherein the reduction and the increase of the firing frequency can be related to an average firing frequency provided by the mesa portion of the mask. For example the reduction and increase can be in the range of x % to y % of the average firing frequency with x %>0 and y %≤50%, or y %≤40%, or y %≤30%, or y %≤25%, or y %≤20%, for example. Put differently, when a maximum normalized firing frequency defined by the mask is considered to be 1 (one), this frequency is reduced to some defined fraction x, such as x=0.9, 0.8, 0.7, or 0.6, and then again increased to 1, by introducing small ramps to obtain a peak-valley distribution. Accordingly, some nozzles go from a 1 to x usage and some nozzles go from an x to 1 usage in terms of normalized firing frequency.

In examples of this disclosure, the mesa portion of the first mask can comprise at least two first peaks and a first valley between the two first peaks and the mesa portion of the second mask can comprise at least two second valleys and at least one second peak between the two second valleys, the peaks of one mask overlapping with the valleys of the other mask and the valleys of the one mask overlapping with the peaks of the other mask. The number of peaks of the first mask corresponds to the number of valleys of the second mask, and the total number, N, of peaks of the first masks can be related to the number, P, of passes of a multi-pass printing mode, with P=n·N, and with n being an integer number.

In between two masks, which are applied to two nozzle trenches for ejecting the different types of fluids, the peaks and the valleys of the masks will alternate. This configuration of the masks helps to ensure that two fluids of different types, such as two different color inks, when deposited in a multi-pass bidirectional printing mode, are predominantly deposited in the same order and time sequence on top of each other so as to avoid banding effects which result from printing colors in different order in bidirectional print modes.

Some examples of masking schemes of this disclosure are described with reference to FIGS. 4 and 5. These masking schemes are used on two nozzle trenches of different printing fluids which can be provided on the same print head or on separate print heads. The masking schemes are applied in a bidirectional multi-pass print mode.

FIG. 4 shows one example of a pair of printing masks 30, 40 which can be applied to a first row of fluid ejection nozzles and a second row of fluid ejection nozzles of print heads, such as one of the print heads shown in FIG. 3. The two rows of fluid ejection nozzles eject inks of different types, such as different color inks.

The two masks, shown in FIG. 4, both comprise a middle mesa portion 32, 42 which is flanked by two side ramp portions 34, 36 and 44, 46 respectively. In the mesa portion 32, 42 of each of the masks 30, 40, the firing frequency is not flat, i.e., constant or approximately constant, but it is varied by increasing and decreasing the firing frequency in the form of peaks 38 and valleys 48 which are formed by small ramps, i.e. ramps which usually are smaller than the side ramp portions 34, 36, 44, 46 and which do not reduce the firing frequency to zero. In the example shown in FIG. 4, the mesa portion 32 of first mask 30 comprises two peaks 38 which overlap with two valleys 48 of the second mask 40.

The mesa portions 32, 42 may result in low frequency of usage of nozzles in alternate colors and hence may reduce color hue shift effects when printing with multiple colors, in a bidirectional printing mode. On the other hand, nozzles in the middle portion of the nozzle trench may be used more equally than when providing voids or extreme ramps at the ends of the swath and hence not at all using some of the nozzles.

This effect can be explained with reference to a simple example using a mask with no ramps. If a print mode comprises e.g. four passes and is bidirectional using a square mask so that every nozzle within the print head has the same duty, hue shift effects may occur because the ink order differs depending on the printing direction. One way to avoid this would be to use alternate masks on the colors involved, playing with voids within the mask. In the extreme, a square mask may be used which uses just half the nozzles for each color, but in alternate modes: considering two parallel nozzle trenches for two colors, the masking scheme would be such that only the top (or right-hand, depending on the orientation) half of the nozzle trench would be used for one color, such as magenta, and only the bottom (or left-hand) half of the other nozzle trench would be used for the other color, such as cyan. Such a masking scheme could be implemented by using two complementary masks providing zeroes for one half of tire nozzle trench and ones for the other half of the nozzle trench. With such a configuration, the lay down order of colors will always be the same one, no matter how the printing direction is, thus avoiding hue shift problems. On the other hand, the nozzles that work will have to eject ink at double frequency, while other nozzles will not operate at all. If after some time it is desired to print again with all of the nozzles, drop rate and velocity will be different between different portions of the nozzle trenches, leading to new banding and hue shift problems.

The present disclosure proposes a "more moderate" variation of nozzle usage over the length of the nozzle trench wherein, considering a pair of nozzle trenches electing different color inks, in corresponding portions of the nozzle trenches, the firing frequency is increased for one of the trenches and decreased for the other trench. In other words, the frequency of usage in alternate colors is decreased and increased in a complementary or approximately complementary manner wherein the usage of nozzles over the length of the nozzle trench is still approximately the same, with no voids or sharp decrease of nozzle usage. Depending on an image to be printed and an image quality to be achieved, the amplitude of the nozzle frequency variation, represented by peaks and valleys, can be varied, to find a compromise between image quality and print head firing frequency.

A good compromise is found by the proposed set of masks, each mask having a mesa portion wherein, within said mesa portions, the nozzle firing frequency is varied between the two masks in a complementary or approximately complementary manner, without reducing the firing frequency to zero. Accordingly, it is possible to minimize banding effects due to different order ink lay down during bidirectional printing while maintaining a good firing frequency profile of the print beads. As side effect, the operation temperature of the print heads can be controlled and temperature invoked problems may be avoided.

FIG. 5 shows another example of two alternate masking profiles 50, 60 which can be applied to two nozzle trenches for ejecting different colors in a multi-pass bidirectional printing mode. The profiles shown in FIG. 5 may, in some examples, be used in combination with side ramp portions as shown in FIG. 4 and further can be extended or reduced to comprise more or less peaks and valley portions.

Assuming that the peaks of the two profiles shown in FIG. 5 correspond to a normalized nozzle firing frequency of 1, the two nozzle profiles 50, 60 vary the firing frequency within the mesa portion to create peak-valley distributions so that, in the first masking profile 50, the normalized firing frequency comes from 1 to 0.7 for example, and then back from 0.7 to 1 etc., while the opposite distribution is provided in the other masking profile 60. The reduction of the firing frequency from 1 to 0.7 is just one example and other values and distributions may be chosen; the shape, amplitude and number of peaks and valleys can be varied.

The masking profiles 50, 60 shown in FIG. 5 can be used to define mesa portions 52, 62 of print masks, which may, but do not have to be flanked by side ramp portions.

Either one of the set of masks shown in FIGS. 4 and 5 can be applied to two nozzle trenches ejecting different color inks to reduce banding effects of bidirectional printing, while maintaining a more equally distributed nozzle usage, when compared to the use of masks having voids. The number of peaks and valleys, two in FIG. 4 and three in FIG. 5, can correlate to the number of passes of a multi-pass printing mode. The number of passes of the multi-pass print mode can be an integer multiple of the number of peaks and valleys. In the example FIG. 5, it could be a three-pass, six-pass, or twelve-pass print mode. In the example of FIG. 4, it could be a two-pass, four-pass, or eight-pass print mode, for example. Higher pass numbers could also be selected. The same or different masks can be used for leftward and rightward printing.

FIG. 6 shows a flow diagram of a method according to one example. The example shown in FIG. 6 starts with receiving print data, at 80, wherein print data can be received from my source, such as a host computer, server, a peripheral device, of from a remote source via the internet or an intranet, without any limitation. The print date may be received by a printer controller within a printer or external to the printer for processing data to be printed. The print data defines an image to be printed. This image to be printed is divided between at least two rows of fluid ejection nozzles, at 82. In the example described, any pattern or image to be printed wilt be printed in pre-determined number of passes per swath, in a bidirectional print mode. First and second masks are generated 84, the first and second masks comprising mesa portions, wherein the mesa portion of the first mask includes at least a first peak and the mesa portion of the second mask includes at least a second valley, the first peak overlapping with the second valley. After the image to be printed has been divided between the rows of fluid ejection nozzles of print beads, the first mask is applied to the first row of fluid ejection nozzles and the second mask is applied to the second row of fluid ejection nozzles, at 86; and the image is printed 88 with selected nozzles, as determined by the first and second mask, during each pass of a multi-pass bidirectional print mode. In the forward and backward directions, the same of different masks can be applied to a respective row of fluid ejection nozzles. Based on the image portion attributed to each tow of nozzles and the associated mask, one pass is printed with said masked first and second rows of fluid ejection nozzles.

The invention claimed is:

1. A method of controlling a printer to print a pattern from a first row of fluid ejection nozzles and a second row of fluid ejection nozzles in a multi-pass printing mode, the first and second rows of fluid ejection nozzles ejecting fluid of a first type and fluid of a second type, respectively, the method comprising:
assigning respective parts of the pattern to be printed to the first and second rows of fluid ejection nozzles;
applying a first mask to the first row of fluid ejection nozzles and a second mask to the second row of fluid ejection nozzles for printing with selected nozzles of each of the rows of fluid ejection nozzles during each pass;
wherein the first mask comprises a mesa portion and the second mask comprises a mesa portion;
wherein the mesa portion of the first mask includes at least a first peak and the mesa portion of the second mask includes at least a second valley, the first peak overlapping with the second valley; and
wherein the first and second masks further comprise first and second side ramped portions each, wherein the respective mesa portions of the first and second masks are located between the respective first and second side ramped portions, wherein peaks and valleys in the mesa portion of either mask have an amplitude smaller than an amplitude of the first and second side ramped portions.

2. The method of claim 1 wherein each mask specifies a frequency at which the nozzles of the associated row of fluid ejection nozzles are fired.

3. The method of claim 2 wherein a valley defines a reduction of firing frequency and a peak defines an increase of firing frequency, wherein the reduction and the increase are in the range of x % to y % of an average firing frequency defined by the mesa portion of the mask, with x %>0 and y %≤50%, or y %≤40%, or y %≤30%, or y %≤25%, or y %≤20%.

4. The method of claim 3 wherein the mesa portion of the first mask includes at least two first peaks and a first valley between the two first peaks and the mesa portion of the second mask includes at least two second valleys and at least one second peak between the two second valleys, the peaks of one mask overlapping with the valleys of the other mask and the valleys of the one mask overlapping with the peaks of the other mask.

5. The method of claim 3 wherein the number of peaks of the first mask corresponds to the number of valleys of the second mask, the peaks of the first mask overlapping with the valleys of the second mask, and wherein the total number, N, of peaks of the first masks is related to the number, P, of passes of a multi-pass printing mode, with P=n·N, and with n being an integer number.

6. The method of claim 3 wherein the number of peaks of the first mask is a multiple of a number of bidirectional passes of a multi-pass printing mode of the printer.

7. The method of claim 1 wherein the same set of print masks is used for leftward and rightward printing.

8. The method of claim 7 wherein at least one of the order of fluid laydown and the timing of fluid laydown of printing fluid from the first and second rows of fluid ejection nozzles is constant during bidirectional printing.

9. The method of claim 1 wherein first row of fluid ejection nozzles and the second row of fluid ejection nozzles eject inks of different colors.

10. The method of claim 1 wherein the mesa portion of the first mask and the mesa portion of the second mask are complementary or substantially complementary.

11. The method of claim 1 wherein, during bidirectional printing, a same set of print masks is used for both leftward and rightward printing such that an order of fluid laydown as between the first and second types of fluid, which are different types of fluid, is constant.

12. The method of claim 1 wherein the mesa portion of the first mask and the mesa portion of the second mask are complementary.

13. A computer program for controlling operation of a printer, the printer including a number of print heads comprising at least a first row of fluid ejection nozzles and at least a second row of fluid ejection nozzles, the first and second rows of fluid ejection nozzles providing fluid of a first type and fluid of a second type, respectively, the printer further including a printer controller executing the computer program, the computer program comprising modules for:
receiving print data describing an image to be printed;
assigning respective parts of the image to be printed to the first and second rows of fluid ejection nozzles;
generating a first mask and a second mask;
applying the first mask to the first row of fluid ejection nozzles and the second mask to the second row of fluid ejection nozzles for printing with selected nozzles of each of the rows of fluid ejection nozzles during a number of passes corresponding to a multi-pass printing mode, wherein each mask specifies a frequency at which the nozzles of the associated row of fluid ejection nozzles are fired; and
printing the image;
wherein each of the masks comprises a mesa portion and first and second ramp portions at both sides of the mesa portion, wherein the mesa portion of the first mask includes at least a first peak and the mesa portion of the second mask includes at least a second valley, the first peak overlapping with the second valley; and wherein the peaks and valleys in the mesa portions of the first and second masks have an amplitude smaller than an amplitude of the first and second ramp portions at the sides of the mesa portions.

14. The computer program of claim 13 wherein a valley defines a reduction of firing frequency and a peak defines an increase of firing frequency, wherein the reduction and the increase are in the range of x % to y % of an average firing frequency defined by the mesa portion of the mask, with x %>0 and y %≤50%, or y %≤40%, or y %≤30%, or y %≤25%, or y %≤20%.

15. The computer program of claim 14 wherein the number of peaks of the first mask corresponds to the number of valleys of the second mask, the peaks of the first mask overlapping with the valleys of the second mask, and wherein the total number, N, of peaks of the first masks is related to the number, P, of passes of a multi-pass printing mode, with P=n·N, and with n being an integer number.

16. A printer including
a number of print heads comprising a number of nozzle trenches, including a first nozzle trench and a second nozzle trench ejecting fluid of a first type and fluid of a second type, respectively; and
a printer controller including a control program to control ejection of printing fluid from the print heads and applying a first masks to the first nozzle trench and a second mask to the second nozzle trench to print with selected nozzles of each nozzle trench during a number of passes corresponding to a multi-pass printing mode;

wherein each of the masks comprises a mesa portion and first and second ramp portions at both sides of the mesa portion, wherein the mesa portion of the first mask includes at least two first peaks and a first valley between the two first peaks and the mesa portion of the second mask includes at least two second valleys and at least one second peak between the two second valleys, the peaks of one mask overlapping with the valleys of the other mask and the valleys of the one mask overlapping with the peaks of the other mask;

wherein the peaks and valleys in the mesa portions of the first and second masks have an amplitude smaller than an amplitude of the first and second ramp portions at the sides of the mesa portions.

17. The printer of claim 16 wherein one of the print heads includes ink of a first color and another one of the print heads includes ink of a second color, the first and second colors being different from one another.

18. The printer of claim 16 wherein, during bidirectional printing, a same set of print masks is used for both leftward and rightward printing such that an order of fluid laydown as between the first and second types of fluid, which are different types of fluid, is constant.

* * * * *

UNITED STATES PATENT AND TRADEMARK OFFICE
CERTIFICATE OF CORRECTION

PATENT NO. : 10,242,298 B2
APPLICATION NO. : 15/542813
DATED : March 26, 2019
INVENTOR(S) : Antonio Gracia et al.

Page 1 of 1

It is certified that error appears in the above-identified patent and that said Letters Patent is hereby corrected as shown below:

On the Title Page

Item (57), Abstract, Line 9, delete "said" and insert -- fluid --, therefor.

Signed and Sealed this
Second Day of July, 2019

Andrei Iancu
*Director of the United States Patent and Trademark Office*